United States Patent [19]
Osuga

[11] Patent Number: 5,644,645
[45] Date of Patent: Jul. 1, 1997

[54] FINGERPRINT IMAGE TRANSMISSION SYSTEM UTILIZING REVERSIBLE AND NON-REVERSIBLE DATA COMPRESSION CODING TECHNIQUES

[75] Inventor: Yoshikazu Osuga, Tokyo, Japan

[73] Assignee: NEC Corporation, Tokyo, Japan

[21] Appl. No.: 294,726

[22] Filed: Aug. 22, 1994

[30] Foreign Application Priority Data

Aug. 20, 1993 [JP] Japan ................... 5-226719

[51] Int. Cl.⁶ ........................................ G06K 9/00
[52] U.S. Cl. ................... 382/124; 358/435; 382/244
[58] Field of Search ................................ 382/116, 124, 382/125, 233, 234, 237, 243, 259, 257, 258, 232, 244, 240; 358/405, 435

[56] References Cited

U.S. PATENT DOCUMENTS

| | | | |
|---|---|---|---|
| 3,975,709 | 8/1976 | Beun et al. | 340/146.3 |
| 4,310,827 | 1/1982 | Asai | 340/146.3 |
| 4,817,183 | 3/1989 | Sparrow | 382/4 |
| 4,993,068 | 2/1991 | Piosenka et al. | 380/23 |
| 5,033,106 | 7/1991 | Kita | 382/56 |
| 5,048,111 | 9/1991 | Jones et al. | 382/240 |
| 5,093,872 | 3/1992 | Tutt | 382/56 |
| 5,218,431 | 6/1993 | Gleicher et al. | 348/472 |
| 5,222,152 | 6/1993 | Fishbine et al. | 382/2 |
| 5,321,521 | 6/1994 | Nomizu | 358/426 |
| 5,408,542 | 4/1995 | Callahan | 382/244 |
| 5,432,871 | 7/1995 | Novik | 382/232 |
| 5,444,552 | 8/1995 | Smith, III | 358/465 |

Primary Examiner—Michael T. Razavi
Assistant Examiner—Jayanti K. Patel
Attorney, Agent, or Firm—Young & Thompson

[57] ABSTRACT

A fingerprint image transmission system includes a remote computer system and a central computer system. In the remote computer system, a gray image of a fingerprint image sampled by an image scanner portion (10) is compressed by a non-reversible (lossy) coding by a non-reversible coding mechanism (202) and a skeleton pattern generated by a skeleton generating mechanism (201) by inputting the gray image, is compressed by a reversible (lossless) coding by a reversible coding mechanism (203). The compressed gray image and the compressed skeleton pattern are transmitted to the central computer system through a transmission mechanism (31). In the central computer system, a receiver mechanism (41) receives the gray image and the skeleton pattern transmitted from the remote computer system. A skeleton editing portion (60) performs correction of the skeleton pattern decompressed by a skeleton decompressing mechanism (502) with reference to the gray image decompressed by a gray image decompressing mechanism (501), and extracts feature points in the skeleton pattern to record in a database (80).

3 Claims, 8 Drawing Sheets

FINGERPRINT IMAGE TRANSMISSION SYSTEM UTILIZING REVERSIBLE AND NON-REVERSIBLE DATA COMPRESSION CODING TECHNIQUES

BACKGROUND OF THE INVENTION

1. Field of the Invention

This invention relates generally to a fingerprint image transmission system. More specifically, the invention relates to a fingerprint image transmission system for compressing and transmitting a fingerprint image from a remote computer system for sampling the fingerprint image to a central computer system recording the feature of the fingerprint in a database.

2. Description of the Related Art

In the related art, as image data compression system for transmitting an image data, there are a reversible or lossless coding (an information preserving or lossy coding) and a non-reversible coding (non-information preserving coding).

The reversible coding is a compression system which permits complete restoration of an original image. While the reversible coding achieves lower compression effect than the non-reversible coding, it is suitable for image transmission and accumulation when drop out of information is not permitted.

The non-reversible coding is a compression system for compressing an image data which sacrifices a part of information and thus is suitable for the case where high compression effect is given higher preference than complete restoration of the original image. As the reversible coding, there are a run length coding (Wyle coding, Huffman coding and so forth) disclosed in W. K. Pratt "Digital Image Processing", Wiley-Interscience, 1978, a predictive coding disclosed in AT & T "Pattern Recognition Coding", CCITT SG VIII, Delayed Document, D124, 1982, an Elias coding disclosed in G. G. Langdon, Jr. and J. Rissanen, "Compression of Black-White Images with Arithmetic Coding", IEEE Trans. Vol. CON-29, No. 6, pp. 858–867, and Chain coding disclosed in H. Freeman, "Boundary Encoding and Processing" in Picture Processing and Psychopictories (B. S. Lipkin and A. Rosenfeld, eds.), Academic Press, 1970. On the other hand, as the non-reversible coding, there are a Discrete Cosine Transform disclosed in K. R. Rao and P. Yip, "Discrete Cosine Transform Algorithms, Advantages, Applications", Academic Press, 1990 and so forth.

In application of such image data compression systems to a fingerprint image transmission system, a compression factor cannot be made satisfactorily large to effectively reduce a data amount to be transmitted if solely the reversible coding is employed. Because of this, it takes a long time to transmit a thus compressed image. On the other hand, if the non-reversible coding is solely employed, the image before compression cannot be exactly reproduced without loss of data in a certain part.

SUMMARY AND OBJECTS OF THE INVENTION

It is an object of the invention to provide a fingerprint image transmission system achieving high transmission efficiency between a remote computer system sampling a fingerprint image and a central computer system analyzing the fingerprint image and recording in a database.

Another object of the invention is to provide a fingerprint image transmission system, in which the feature of a fingerprint image can be exactly extracted in the central computer system, in which the received compressed fingerprint image data is decompressed.

One embodiment of a fingerprint image transmission system according to the invention transmits a fingerprint image from a remote computer system which samples the fingerprint image to a central computer system which performs analysis of a fingerprint wherein the remote side computer system comprises an image scanner portion for inputting the fingerprint image and generating a gray image as data indicative of the tone of respective pixels of the fingerprint image, an image compression portion for inputting the gray image generated by the image scanner portion and compressing the gray image in such a manner that no information will be lost upon decompression of the gray image, and a transmitting portion of the remote computer system for feeding the gray image compressed by the image compressing portion to a gray image transmission path, and the central computer system comprises a receiving portion for receiving the gray image transmitted from the remote computer system via the transmission path, an image decompression portion for inputting the gray image received by the receiving portion of the central computer system, decompressing the gray image for reproducing an original gray image, and generating a skeleton pattern as data indicative of ridge portions of the minutiae of the finger print from the reproduced gray image, a skeleton editing portion for inputting a skeleton pattern and the gray image generated by the image decompressing portion, providing an editing screen for a user for correction of the skeleton pattern with reference to the gray image for enabling correction, and extracting feature points from the corrected skeleton pattern, and a database recording portion recording the feature points of the skeleton pattern extracted by the skeleton editing portion and the gray image in a database.

A second embodiment of a fingerprint image transmission system according to the invention is a variation of the first embodiment, wherein the image compressing portion comprises a non-reversible coding mechanism for inputting the gray image and compressing the gray image while eliminating a high frequency band, a skeleton generating mechanism for inputting the gray image generated by the image scanner portion and generating a skeleton pattern as data indicative of ridge portions of the minutiae of the finger print from the reproduced gray image, and a reversible coding mechanism for compressing the skeleton pattern generated by the skeleton generating mechanism in such a manner that no information will be lost upon decompression of the skeleton pattern; wherein the transmitting portion of the remote computer system comprises a transmitter mechanism for feeding the gray image compressed by the non-reversible coding mechanism and the skeleton pattern compressed by the reversible coding mechanism to transmission path, the receiving portion of the center side computer system comprises a receiver mechanism for receiving the gray image and the skeleton pattern transmitted from the remote side computer system via the transmission path and separating the gray image and the skeleton pattern, the image decompression portion comprises a gray image decompression mechanism for inputting the gray image received and separated by the receiver mechanism for reproducing an original gray image, and a skeleton decompression mechanism inputting the skeleton pattern received and separated by the receiver mechanism and reproducing the original skeleton pattern before compression, and wherein the skeleton editing portion inputs a skeleton pattern decompressed by the skeleton decompression mechanism and the gray image decompressed by the gray image decompression mechanism, provides an editing screen for a user for correction of the skeleton pattern with reference to the gray image for enabling correction, and extracts feature points from the corrected skeleton pattern.

A further embodiment of an image data transmission system in a data communication network according to the invention is a variation of the first embodiment, wherein an image source system comprises an image scanner portion for sampling an image of an object and generating image data as data indicative of tone of respective pixel of the sampled image, and an image compressing portion for inputting the image data and compressing the image data utilizing a data compression method which permits complete restoration of an original image data, for generating a compressed image data, a data communication path for connecting the image source system and an image data processing system for transmitting the compressed image data from the image source system to the image data processing system, and the image data processing system comprises an image decompression portion for inputting the compressed image data received from the data communication path, decompressing the compressed image data for reproducing the original image data, and generating a skeleton pattern as data indicative of particular portions of the image from the reproduced original image data, a skeleton editing portion for inputting a skeleton pattern and the image data generated by the image decompressing portion, providing an editing screen image for a user for correction of the skeleton pattern with reference to an image of the object reproduced on the basis of the original image data for enabling correction, and extracting feature points from the corrected skeleton pattern, and a database recording portion for recording the feature points of the skeleton pattern extracted by the skeleton editing portion and the image data in a database.

Yet another embodiment of an image data transmission system in a data communication network according to the invention is a variation of the second embodiment, wherein the image compressing portion comprises a skeleton generating mechanism for generating a skeleton pattern as data indicative of particular portions of the image, an image data compressing mechanism for inputting the image data and compressing the image data utilizing a first data compression method which achieves high data compression rate sacrificing exactness of a restored image data upon decompression, and a skeleton compressing mechanism for inputting the skeleton pattern from the skeleton generating mechanism and compressing the skeleton pattern utilizing a data compression method which permits complete restoration of an original skeleton pattern, for generating a compressed skeleton pattern, wherein the data communication path connects the image source system and the image data processing system for transmitting the compressed image data and the compressed skeleton pattern from the image source system to the image data processing system, the image decompression portion comprising an image decompression mechanism for inputting the compressed image data received from the data communication path, decompressing the compressed image data for restoring the original image data, and a skeleton decompression mechanism for inputting the compressed skeleton pattern received from the data communication path, and decompressing the compressed skeleton pattern for restoring an original skeleton pattern, and the skeleton editing portion inputs the restored original skeleton pattern and the restored original image data, provides an editing screen image for a user for correction of the skeleton pattern with reference to an image of the object reproduced on the basis of the restored original image data for enabling correction, and extracts feature points from the corrected skeleton pattern.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

In the drawings.

Here, it should be noted that like reference numerals represent like elements throughout the disclosure.

DETAILED DESCRIPTION OF PREFERRED EMBODIMENTS

The invention will be discussed hereinafter in detail in terms of preferred embodiments with reference to the accompanying drawings.

Figure 1:
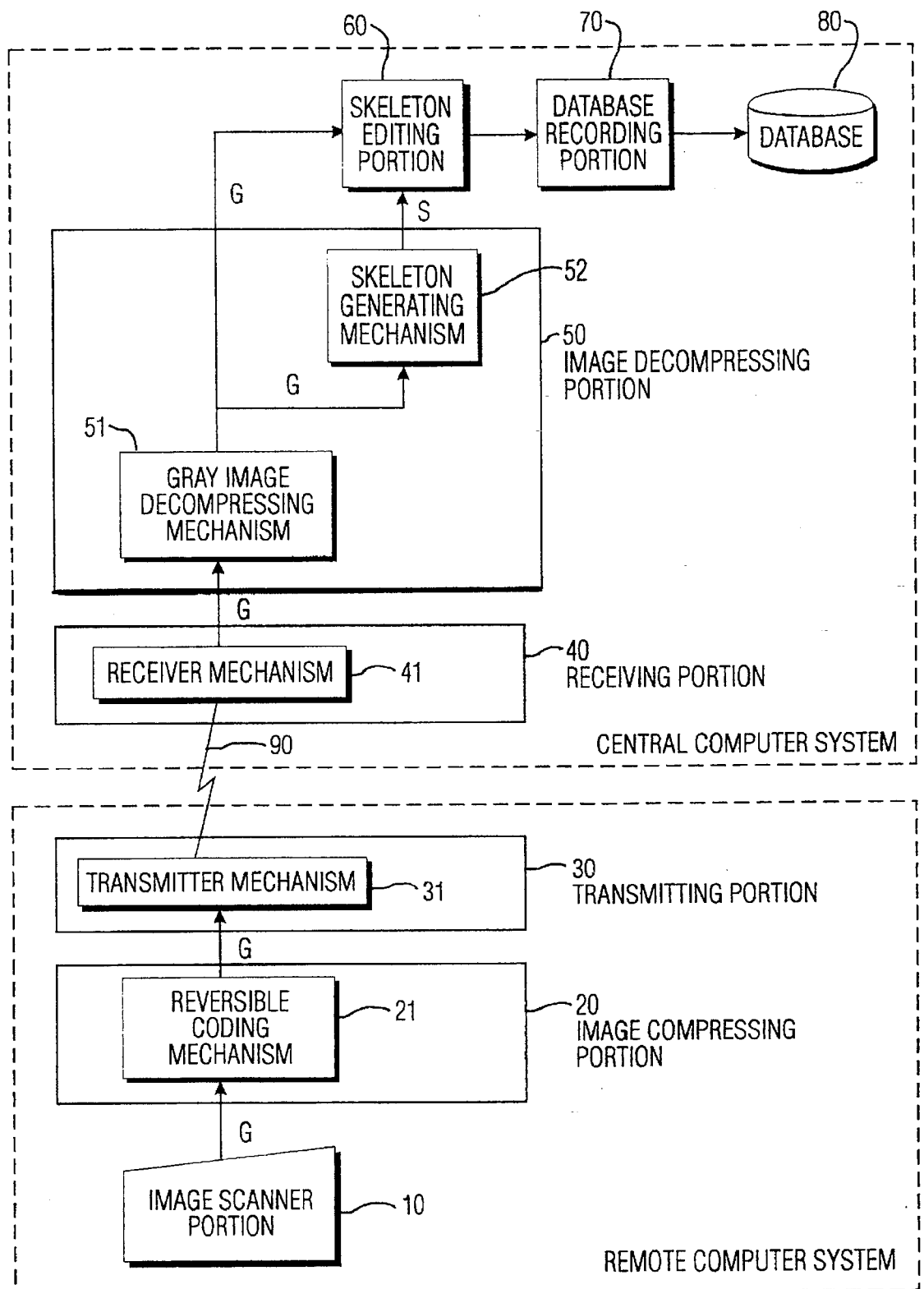
FIG. 1 is a block diagram showing a first embodiment of a fingerprint image transmission system according to the invention.

Referring to FIG. 1, the first embodiment of a fingerprint image transmission system according to the invention includes a remote computer system and a central computer system. The remote computer system comprises an image scanner portion 10 inputting a fingerprint image and generating a gray image as data indicative of the tone of each pixel of the fingerprint image, a reversible coding mechanism 21 provided in an image compressing portion 20, inputting the gray image generated by the image scanner portion 10 and compressing the gray image in such a manner that no data will be lost upon decompression, and a transmitter mechanism 31 provided in a transmitting portion 30 for feeding the gray image compressed by the reversible coding mechanism 21 to a transmission path 90. On the other hand, the central computer system comprises a receiver mechanism 41 provided in a receiving portion 40 for receiving the gray image transmitted through the transmission path 90 from the transmitter mechanism 31, a gray image decompression mechanism 51 provided in an image decompressing portion 50 for receiving a decompressing the gray image received by the receiver mechanism 41 and reproducing the gray image before compression, a skeleton generating mechanism 52 for receiving as input the gray image reproduced by the gray image decompression mechanism 51 and generating a skeleton pattern as data indicative of ridge portions of fingerprint minutiae, a skeleton editing portion 60 receiving as input the skeleton pattern generated by the skeleton generating mechanism 52 and the gray image decompressed by the gray image decompressing mechanism 51 for providing an editing screen for a user so that the skeleton pattern may be corrected with reference to the gray image for enabling correction of the skeleton pattern and extracting feature points from the corrected skeleton pattern, and a database recording portion 70 for recording the feature points of the skeleton pattern extracted by the skeleton editing portion 60 in a database 80.

It should be noted that U.S. Pat. No. 4,310,827 to K. Asai, issued on Jan. 12, 1982 discloses technologies for extracting the skeleton pattern as the information of minutiae from the fingerprint image read by means of the image scanner and for extracting feature points, such as bifurcation, abrupt ending and so forth of the minutiae from the skeleton pattern. In the shown embodiment, the skeleton generating mechanism 52 and the skeleton editing portion 60 utilize these technologies. Therefore, the disclosure of the above-identified U.S. Pat. No. 4,310,827 is hereby incorporated by reference for a teaching of these features.

Next, the operation of the first embodiment of the fingerprint image transmission system according to the present invention will be discussed with reference to FIGS. 1 and 3A to 3H.

Initially, the user operates the image scanner portion 10 to read a fingerprint card, on which a fingerprint is printed.

Figure 3A:
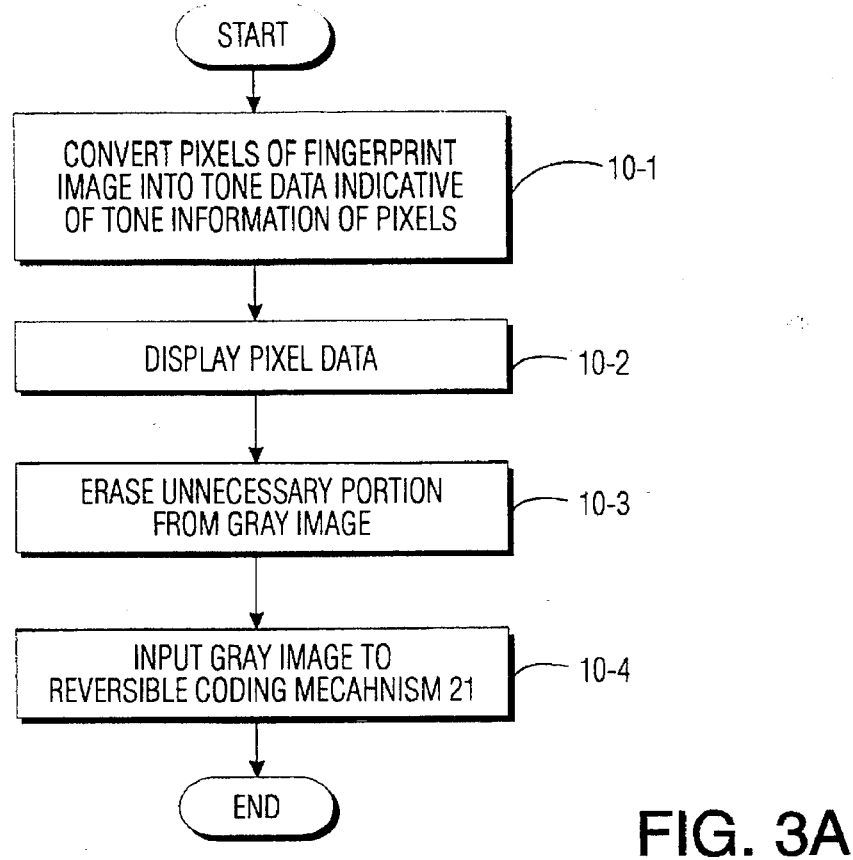
FIGS. 3A to 3H are flow charts showing processes respectively in an image scanner portion 10, a reversible coding mechanism 21, a transmitter mechanism 31, a receiver mechanism 41, a gray scale image decompression mechanism 51, a skeleton generating mechanism 52, a skeleton editing portion 60 and a database recording portion 70, according to the first embodiment of the invention.

The image scanner portion 10 converts respective pixels forming the fingerprint image into data indicative of tone information of the pixels (step 10-1) and displays the image on a terminal (step 10-2), as shown in FIG. 3A. The converted data will be hereinafter referred to as "gray image" and shown by "G" in FIG. 1.

The user makes reference to the gray image displayed on the terminal by the image scanner 10 and erases a portion of the gray image where black or white pixels are concentrated, e.g. a blank field (step 10-3). Thereafter, the gray image is input to the reversible coding mechanism 21 of the image compressing portion 20 (step 10-4).

Figure 3B:
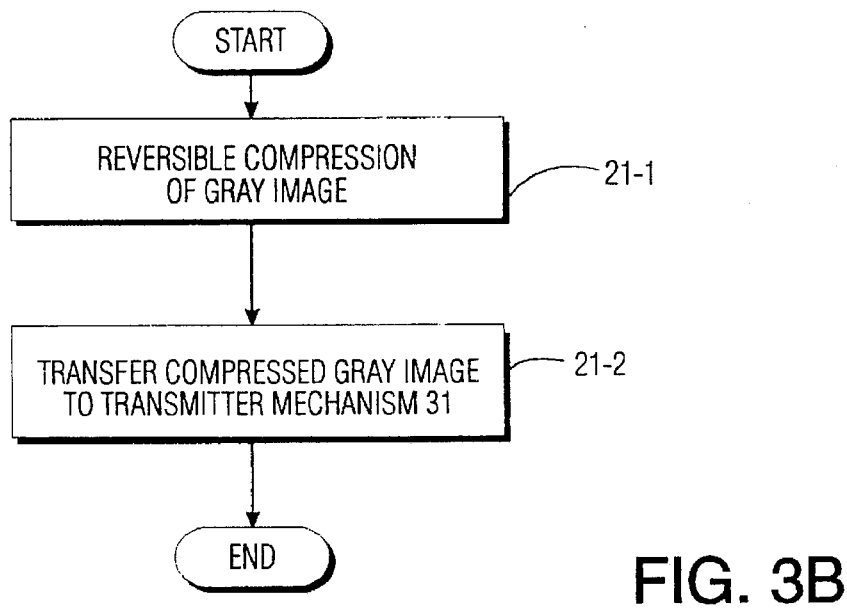

Referring to FIG. 3B, the reversible coding mechanism 21 of the image compressing portion 20, into which the gray image is input by the user, performs compression of the gray image utilizing a reversible coding system, such as Huffman coding (step 21-1). Then, the compressed gray image is transferred to the transmitter mechanism 31 of the transmitting portion 30 (step 21-2).

Figure 3C:
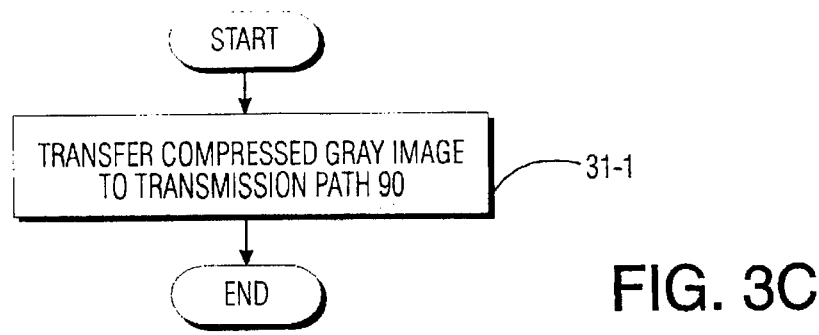

Referring to FIG. 3C, the transmitter mechanism 31 of the transmitting portion 30 transfers the compressed gray image input from the reversible coding mechanism 21 of the image compressing portion 20 to the transmission path 90 (step 31-1).

Figure 3D:
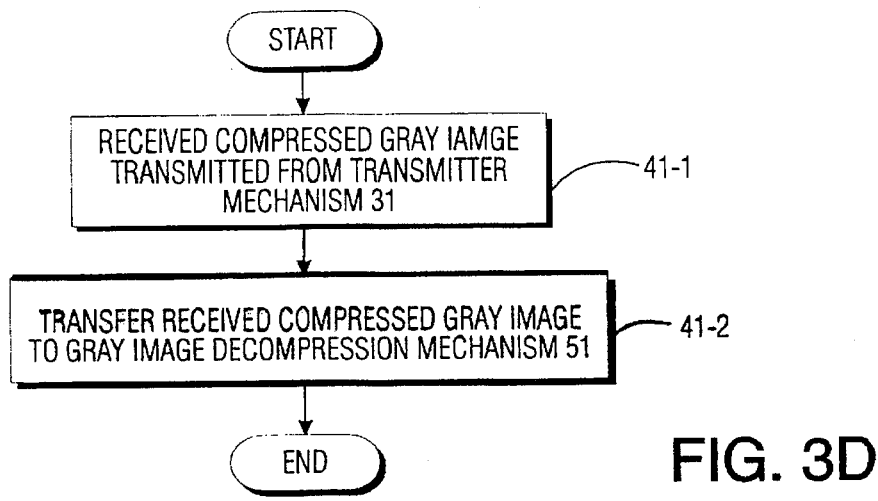
Figure 3E:
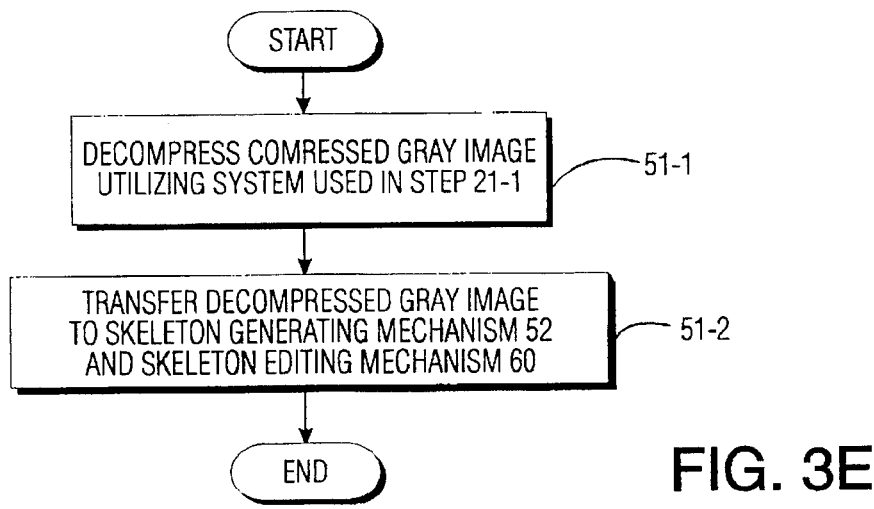

Referring to FIG. 3D, the receiver mechanism 41 of the receiving portion 40 receives the compressed gray image transmitted through the transmission path 90 from the transmitter mechanism 31 of the transmitting portion 30 (step 41-1). Then, the received compressed gray image is transferred to the gray image decompression mechanism 51 (step 41-2).

Figure 3F:
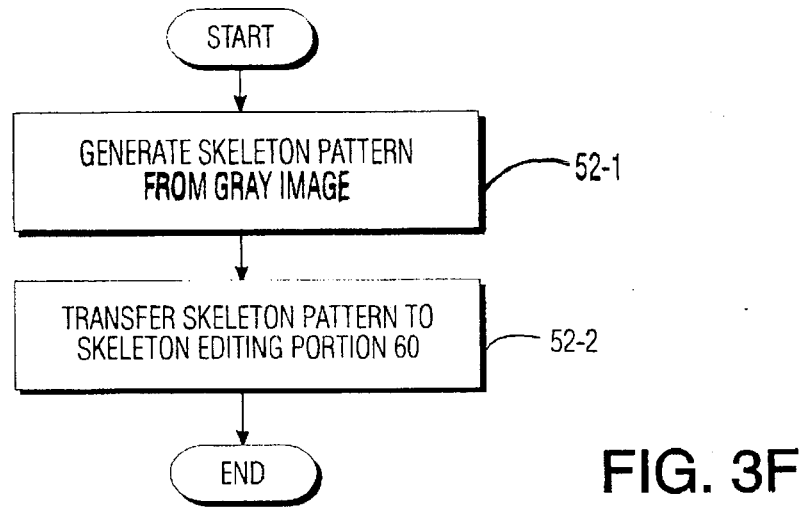

Referring to FIG. 3F, the gray image decompression mechanism 51 in the image decompressing portion 50 decompresses the compressed gray image transferred from the receiver mechanism 41 of the transmitting portion 40 using the system used by the reversible coding mechanism 21, i.e. Huffman coding in the shown embodiment (step 51-1). Then, the decompressed gray image is transferred to the skeleton generating mechanism 52 and the skeleton editing portion 60 (step 51-2).

Referring to FIG. 3F, the skeleton generating mechanism 52 generates a skeleton pattern (indicated by S in FIG. 1) as the ridge information of minutiae of the fingerprint from the gray imaged transferred from the gray image decompressing mechanism 51, by the techniques disclosed in the above-identified U.S. Pat. No. 4,310,827 (step 52-1). The generated skeleton pattern is transferred to the skeleton editing portion 60 (step 52-2).

Figure 3G:
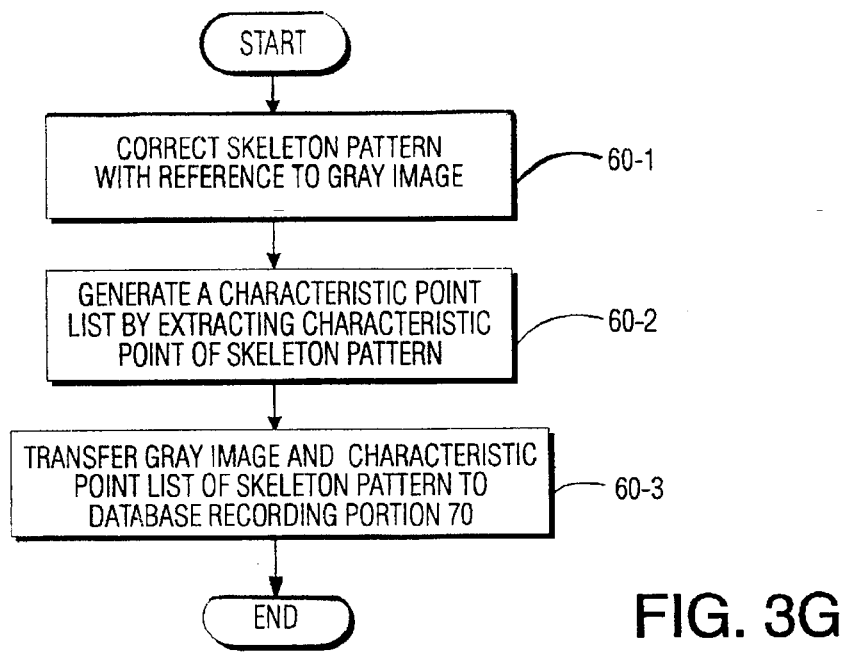

Referring to FIG. 3G, the user makes reference to the skeleton pattern generated by the skeleton generating portion 52, in the skeleton editing portion 60 and effects correction with reference to the gray image transferred from the gray image decompressing mechanism 51 when an unclear part requiring correction is present (step 60-1).

The skeleton editing portion 60 also extracts feature points of the skeleton pattern corrected by the user. According to the techniques disclosed in U.S. Pat. No. 4,310,827, for example and generates a feature point list of the fingerprint image (step 60-2). Then, the feature point list is transferred to the database recording portion 70 together with the gray image (step 60-3).

Figure 3H:
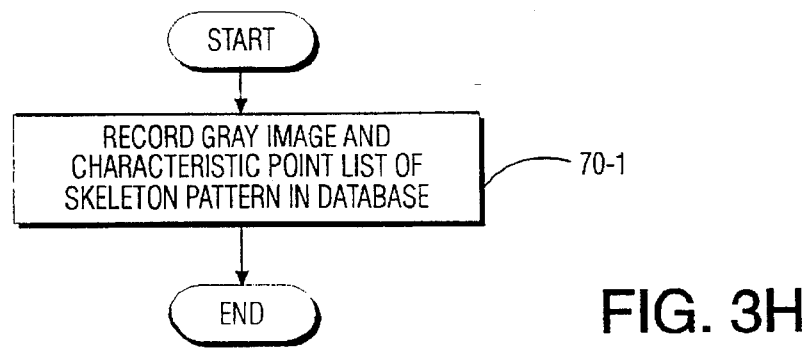

Referring to FIG. 3H, the database recording portion 70 records the feature point list of the skeleton pattern transferred from the skeleton editing portion 60 and the gray image in the database 80 (step 70-1).

Through the process set forth above, the operation of the first embodiment of the fingerprint image transmission system is completed.

An important feature of the first embodiment of the fingerprint image transmission system according to the invention resides at the point where the fingerprint image sampled by the image scanner portion 10 of the remote computer system is reduced in its information amount through reverse coding by the reverse coding mechanism 21 and is then transmitted to the central computer system. By this feature, the first embodiment of the fingerprint image transmission system according to the invention can achieve high transmission efficiency in comparison with transmission of the total fingerprint image.

Another important feature of the first embodiment of fingerprint image transmission system according to the invention resides at the point where the feature points of the skeleton pattern are extracted after the skeleton editing portion 60 of the central computer system corrects the skeleton pattern generated by the skeleton generating mechanism 52 with reference to the gray image decompressed by the image decompressing mechanism 51. By this feature, the first embodiment of the fingerprint image transmission system achieves accurate recording of the features of the fingerprint image in the database.

Figure 2:
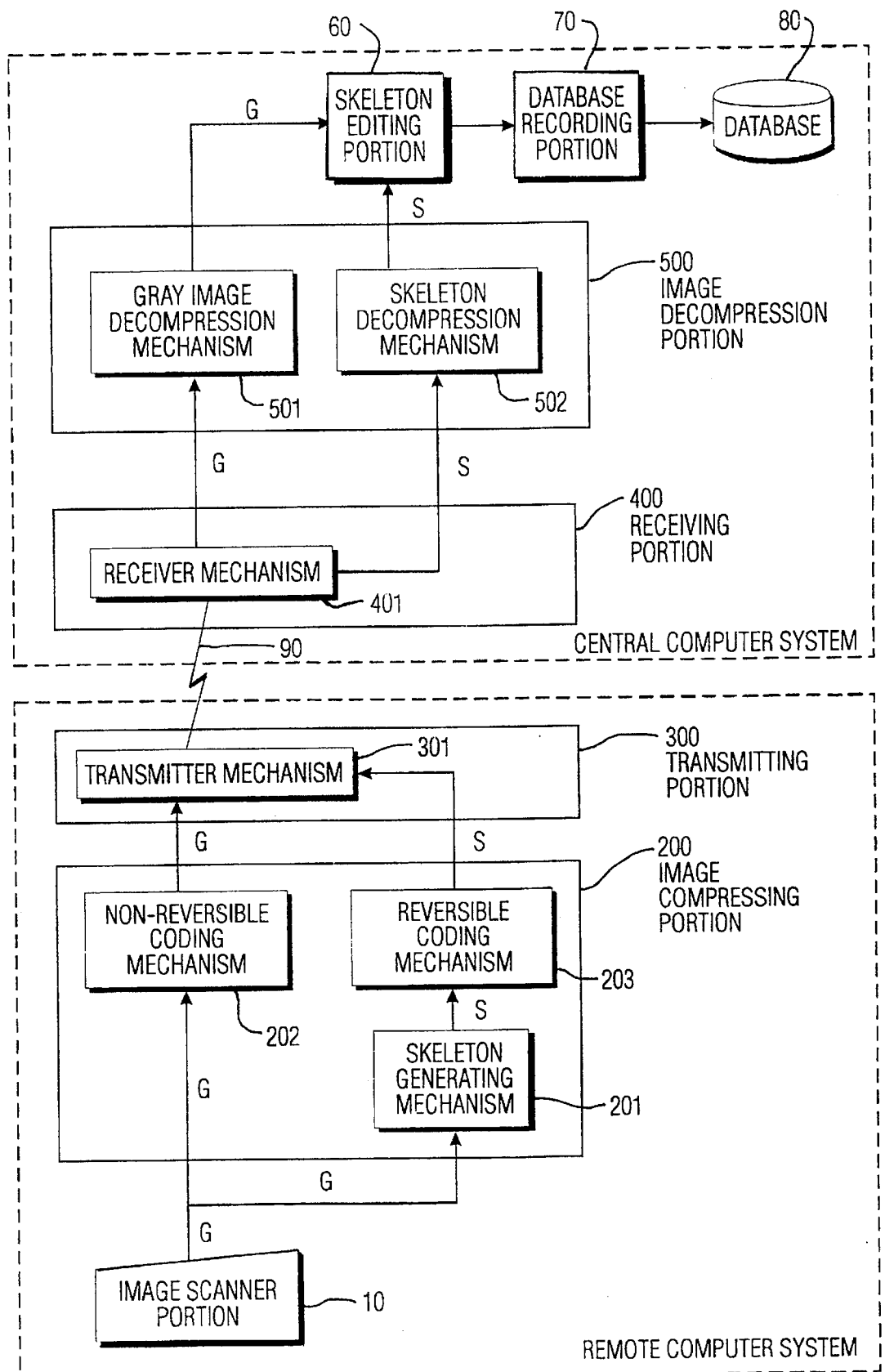
FIG. 2 is a block diagram showing a second embodiment of a fingerprint image transmission system according to the invention.

Referring to FIG. 2, a second embodiment of the fingerprint image transmission system according to the present invention includes a remote computer for sampling the fingerprint image and a central computer system. In this embodiment, the remote computer comprises the image scanner portion 10 inputting the fingerprint image and generating the gray image as the data indicative of the tone of each pixel of the fingerprint image, a skeleton generating mechanism 201 for inputting the gray image generated by the image scanner 10 and generating a skeleton pattern as a data indicative of ridge portions of fingerprint minutiae, a reversible coding mechanism 203 provided in an image compressing portion 200 compressing the gray image in such a manner that no data will be lost upon decompression, a non-reversible coding mechanism 202 of the image compressing portion 200 inputting the gray image generated by the image scanner portion 10 and compressing the gray image with removing the high frequency band, and a transmitter mechanism 301 provided in a transmitting portion 300 for feeding the gray image compressed by the non-reversible coding by the non-reversible coding mechanism 202 and the skeleton pattern compressed by reversible coding by the reversible coding mechanism 203 to a transmission path 90. On the other hand, the central computer system comprises a receiver mechanism 401 provided in a receiving portion 400 for receiving the gray image and the skeleton pattern transmitted through the transmission path 90 from the transmitter mechanism 301, a gray image decompression mechanism 501 provided in an image decompressing portion 500 for receiving and decompressing the gray image received by the receiver mechanism 401 and reproducing the gray image before compression, a skeleton pattern decompression mechanism 502 receiving the skeleton pattern received by the receiver mechanism 401 and decompressing the skeleton pattern to reproduce the skeleton pattern before compression, a skeleton editing portion 60 inputting the gray image decompressed by the gray image decompression mechanism 501 and the skeleton pattern decompressed by the skeleton decompression mechanism 502 for providing an editing screen for a user so that the skeleton pattern may be corrected with reference to the gray image for enabling correction of the skeleton pattern and extracting feature points from the corrected skeleton pattern, and the database recording portion 70 for recording the feature points of the skeleton pattern extracted by the skeleton editing portion 60 in a database 80.

It should be noted that U.S. Pat. No. 4,310,827, to K. Asai, issued on Jan. 12, 1982 discloses technologies for extracting the skeleton pattern as the information of minutiae from the fingerprint image read by means of the image scanner and for extracting feature points, such as bifurcation, abrupt ending and so forth of the minutiae from the skeleton pattern. In the shown embodiment, the skeleton generating mechanism 201 and the skeleton editing portion 60 utilize these technologies.

Next, the operation of the second embodiment of the fingerprint image transmission system according to the present invention will be discussed hereinafter with reference to FIGS. 2 and 4A to 4J.

Initially, the user operates the image scanner portion 10 to read a fingerprint card, on which a fingerprint is printed.

Figure 4A:
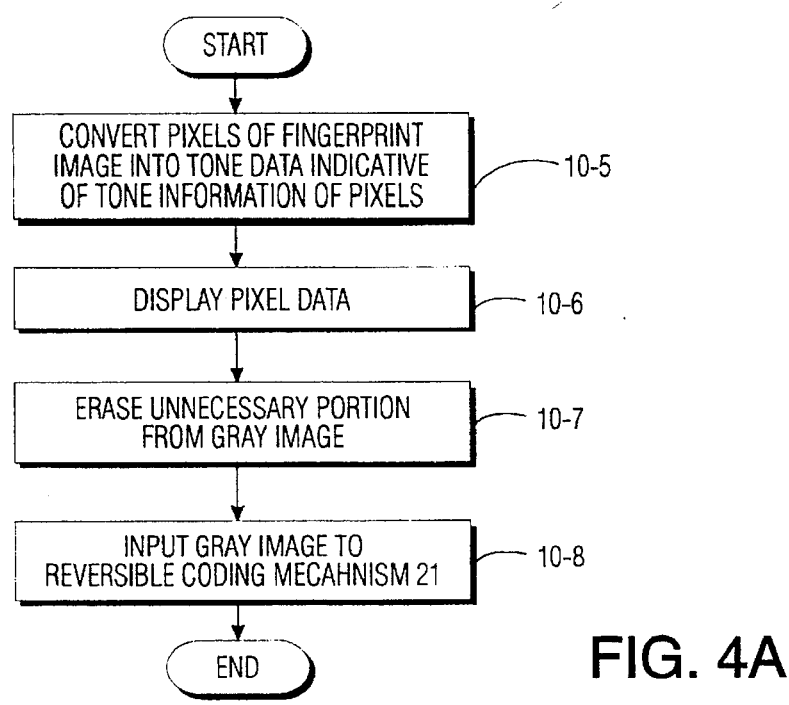
FIGS. 4A to 4J are flow charts showing processes in the image scanner portion 10, a skeleton generating mechanism 201, a non-reversible coding mechanism 202, a reversible coding mechanism 203, a transmitter mechanism 301, a receiver mechanism 401, a gray scale image decompression mechanism 501, a skeleton expansion mechanism, the skeleton editing portion 60 and the database recording portion 70, according to the second embodiment of the invention.

The image scanner portion 10 converts respective pixels forming the fingerprint image into data indicative of tone information of the pixels (step 10-5) and displays the image on a terminal (step 10-6), as shown in FIG. 4A. The converted data will be hereinafter referred to as "gray image" and shown by "G" in FIG. 2.

The user makes reference to the gray image displayed on the terminal by the image scanner 10 and erases a portion of the gray image where black or white pixels are concentrated, e.g. a blank field (step 10-7). Thereafter, the gray image is input to the skeleton generating mechanism 201 and the non-reversible coding mechanism 202 of the image compressing portion 20 (step 10-8).

Figure 4B:
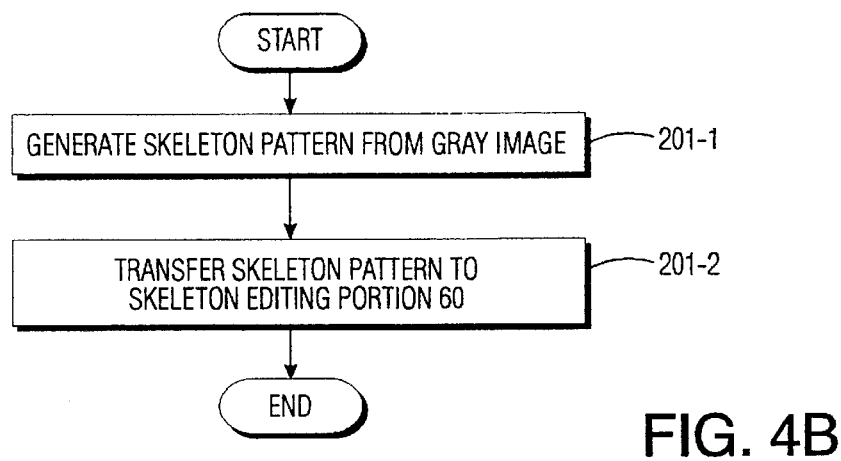

Referring to FIG. 4B, the skeleton generating mechanism 201 input with the gray image by the user generates a skeleton pattern (indicated by S in FIG. 2) as the ridge information of minutiae of the fingerprint from the gray image by the techniques disclosed in the above-identified U.S. Pat. No. 4,310,827 (step 201-1). The generated skeleton pattern is transferred to the reversible coding mechanism 203 of the image compressing portion 200 (step 201-2).

Figure 4C:
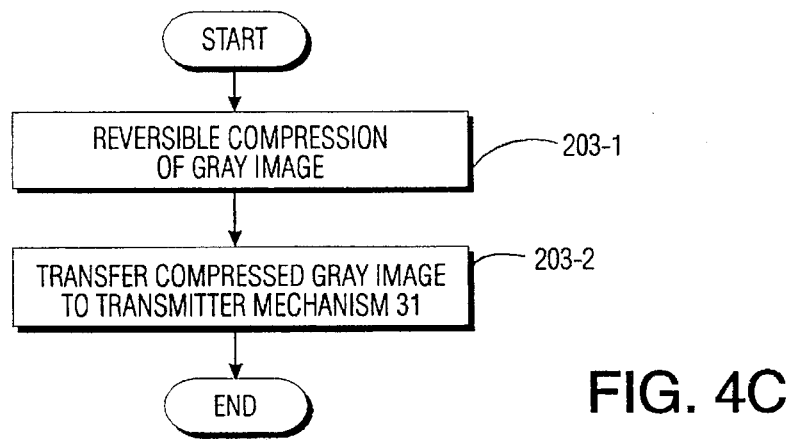

Referring to FIG. 4C, the reversible coding mechanism 203, into which the skeleton pattern is input from the skeleton generating mechanism 201, performs compression of the skeleton pattern utilizing a reversible coding system, such as Huffman coding (step 203-1). Then, the compressed skeleton pattern is transferred to the transmitter mechanism 301 of the transmitting portion 300 (step 203-2).

Figure 4D:
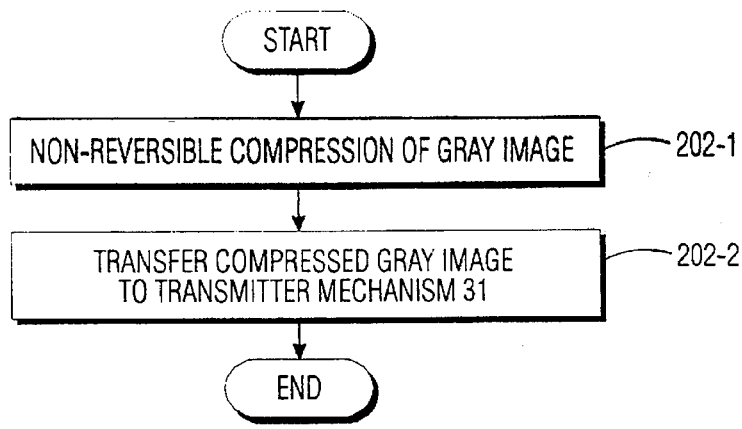

Referring to FIG. 4D, the non-reversible coding mechanism 202 of the image compressing portion 200, into which the gray image is input by the user, performs compression of the gray image utilizing the non-reversible coding system, such as Discrete Cosine Transform (step 202-1). Then, the compressed gray image is transferred to the transmitter mechanism 301 of the transmitting portion 300 (step 202-2).

Figure 4E:
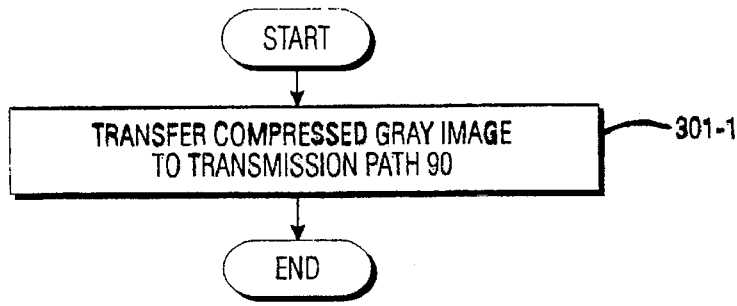

Referring to FIG. 4E, the transmitter mechanism 301 transfers the compressed gray image and the skeleton pattern input from the non-reversible coding mechanism 202 and the reversible coding mechanism 203 to the transmission path 90 (step 301-1).

Figure 4F:
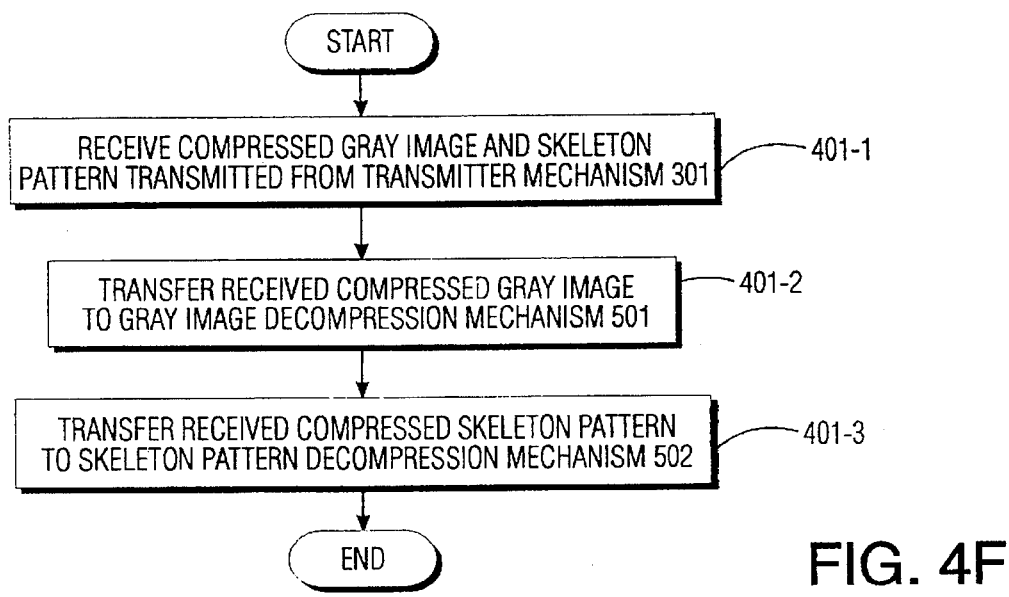

Referring to FIG. 4F, the receiver mechanism 401 of the receiving portion 400 receives the compressed gray image and the skeleton pattern transmitted through the transmission path 90 from the transmitter mechanism 301 (step 401-1). Then, the received compressed gray image and the skeleton is transferred to the gray image decompression mechanism 501 of the image decompressing portion 500 (step 401-2) and the compressed skeleton pattern is transferred to the skeleton decompression mechanism 502 of the image decompressing portion 500 (step 401-3).

Figure 4G:
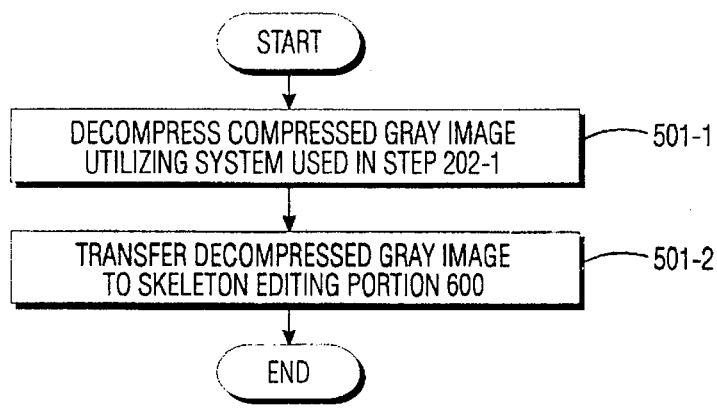

Referring to FIG. 4G, the gray image decompression mechanism 501 decompresses the compressed gray image transferred from the receiver mechanism 401 using the system used by the non-reversible coding mechanism 202, i.e. Discrete Cosine Transform in the shown embodiment (step 501-1). Then, the decompressed gray image is transferred to the skeleton editing portion 600 (step 501-2).

Figure 4H:
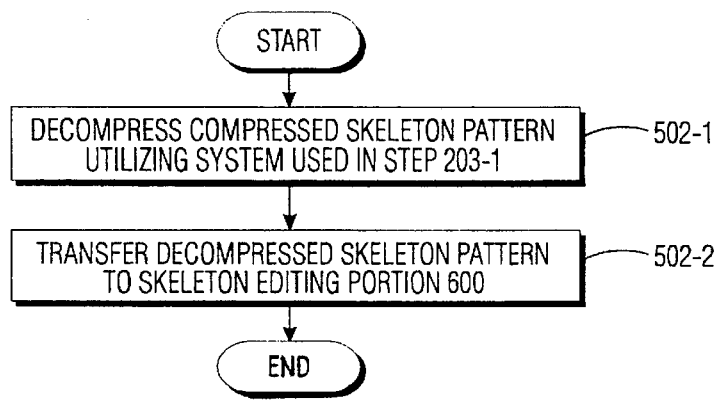

Referring to FIG. 4H, the skeleton pattern decompression mechanism 502 decompresses the compressed skeleton pattern transferred from the receiver mechanism 401 using the system used by the reversible coding mechanism 203, i.e. Huffman coding in the shown embodiment (step 502-1). Then, the decompressed skeleton pattern is transferred to the skeleton editing portion 600 (step 502-2).

Figure 4I:
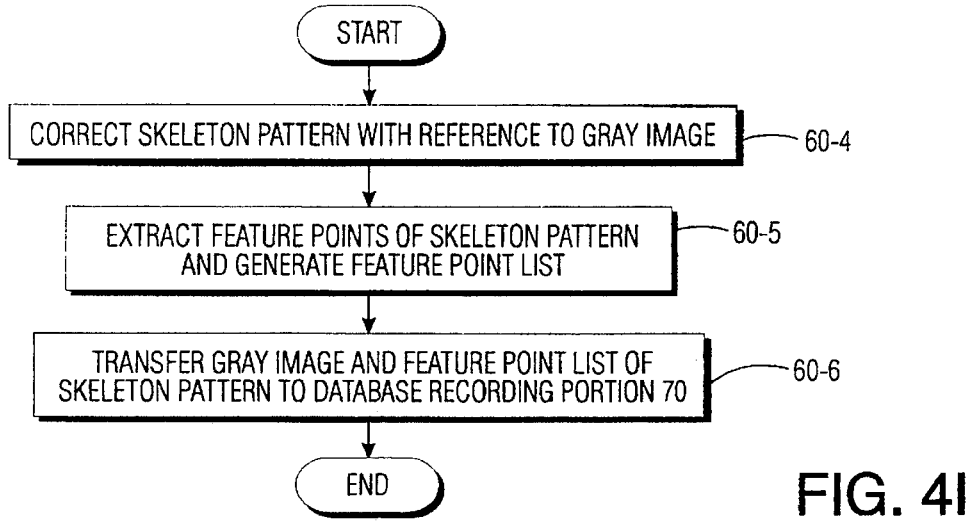

Referring to FIG. 4I, the user makes reference to the skeleton pattern generated by the skeleton decompression portion 502, in the skeleton editing portion 60 and effects correction with reference to the gray image transferred from the gray image decompression mechanism 501 when an unclear part requiring correction is present (step 60-4).

The skeleton editing portion 60 also extracts feature points of the skeleton pattern corrected by the user, according to the techniques disclosed in U.S. Pat. No. 4,310,827, for example and generates a feature point list of the fingerprint image (60-5). Then, the feature point list is transferred to the database recording portion 70 together with the gray image (step 60-6).

Figure 4J:
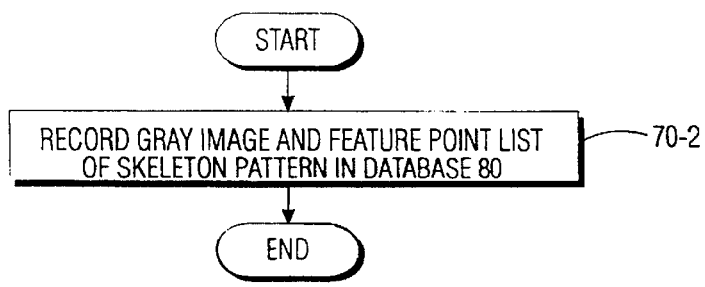

Referring to FIG. 4J, the database recording portion 70 records the feature point list of the skeleton pattern transferred from the skeleton editing portion 60 and the gray image in the database 80 (step 70-2).

Through the process set forth above, the operation of the second embodiment of the fingerprint image transmission system is completed.

The following is a numerical example of information amount in respective parts in the second embodiment of the fingerprint image transmission system according to the invention. When the fingerprint image data input by the image scanner portion 10 is 164 Kbytes, the output of the non-reversible coding mechanism 202 becomes 10 Kbytes, the output of the skeleton generating mechanism 201 becomes 32 Kbytes, and the output of the reversible coding mechanism 203 becomes 7 Kbytes. Therefore, the 164 Kbytes of the original information amount can be transmitted with compression into 17 Kbytes which is approximately one tenth of the original information amount.

An important feature of the second embodiment of the fingerprint image transmission system according to the invention, in contrast to the construction of the first embodiment of the fingerprint image transmission system, resides in the skeleton generating mechanism 201 being provided in the image compressing portion 200 of the remote computer system. This achieves higher transmission efficiency in comparison with the first embodiment of the fingerprint image transmission system by performing non-reversible coding of the gray image of the fingerprint image sampled by the image scanner portion 10 by the non-reversible coding mechanism 202, and, in conjunction therewith, performing reversible coding of the skeleton pattern generated by the skeleton generating mechanism 201 with inputting the gray image, by the reversible coding mechanism 203 and by transmitting the compressed gray image and the skeleton pattern to the central computer system.

Another feature of the second embodiment of the fingerprint image transmission system, similarly to the first embodiment of the fingerprint image transmission system, resides at the point where the feature points of the skeleton pattern are extracted after the skeleton editing portion 60 of the central computer system corrects the skeleton pattern decompressed by the image decompression mechanism 501 with reference to the gray image decompressed by the image decompression mechanism 501. By this feature, the second embodiment of the fingerprint image transmission system also achieves accurate recording of the feature of the fingerprint image in the database.

As set forth above, the invention provides a fingerprint image transmission system which achieves high transmission efficiency between the remote computer system sampling the fingerprint image and the central computer system recording the fingerprint image in the database.

Also, the present invention provides a fingerprint image transmission system which permits exact extraction of features of the fingerprint image in the central computer system receiving the compressed fingerprint image data and compressing the data.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A fingerprint image transmission system for transmitting a fingerprint image from a remote computer system which samples the fingerprint image to a central computer system which performs analysis of a fingerprint, wherein:

said remote computer system comprises an image scanner portion, an image compressing portion and a transmitting portion;

said image scanner portion being input with a fingerprint image and comprising means for generating a gray image as data indicative of tone of respective pixels of said fingerprint image;

said image compressing portion comprising a non-reversible coding mechanism, a skeleton generating mechanism and a reversible coding mechanism;

said non-reversible coding mechanism being input with said gray image and comprising means for compressing the gray image and eliminating a high frequency band;

said skeleton generating mechanism being input with the gray image generated by said image scanner portion and comprising means for generating a skeleton pattern as data indicative of ridge portions of the minutiae of the fingerprint from the reproduced gray image, said skeleton pattern being generated from an entire non-blank area of said gray image;

said reversible coding mechanism comprising means for compressing said skeleton pattern generated by said skeleton generating mechanism in such a manner that no information will be lost upon decompression of said skeleton pattern;

said transmitting portion of said remote computer system comprising a transmitter mechanism;

said transmitter mechanism comprising means for feeding the gray image compressed by said non-reversible coding mechanism together with said skeleton pattern compressed by said reversible coding mechanism to a transmission path; and wherein said central computer system comprises a receiving portion, an image decompressing portion, a skeleton editing portion and a database recording portion;

said receiving portion of said central computer system comprising a receiver mechanism;

said receiver mechanism comprising means for receiving said gray image and said skeleton pattern transmitted from said remote side computer system via said transmission path and means for separating said gray image and said skeleton pattern;

said image decompressing portion comprising a gray image decompression mechanism and a skeleton decompression mechanism;

said gray image decompression mechanism being input with the gray image received and separated by said receiver mechanism for reproducing a decompressed gray image;

said skeleton decompression mechanism being input with the skeleton pattern received and separated by said receiver mechanism and comprising means for reproducing the original skeleton pattern existing before compression;

said skeleton editing portion being input with a skeleton pattern decompressed by said skeleton decompression mechanism and the gray image decompressed by said gray image decompressing mechanism, and comprising means for providing an editing screen for a user for correction of said skeleton pattern with reference to said decompressed gray image for enabling correction, and means for extracting feature points from the corrected skeleton pattern; and said database recording portion comprising means for recording the feature points of said skeleton pattern extracted by said skeleton editing portion and said gray image in a database.

2. A fingerprint image transmission system as claimed in claim 1, wherein said non-reversible coding mechanism comprises means for compressing approximately 164 Kbytes of gray image into approximately 10 Kbytes;

said skeleton generating mechanism comprises means for generating the skeleton pattern having an information amount of approximately 32 Kbytes from the gray image having an information amount of approximately 164 Kbytes; and said reversible mechanism comprises means for compressing approximately 32 Kbytes of the information amount of said skeleton pattern into an information amount of approximately 7 Kbytes.

3. An image data transmission system in a data communication network including an image source system and an image data processing system, said image data transmission system comprising:

an image scanner portion provided in said image source system and comprising means for sampling an image of an object and generating image data indicative of tone of respective pixels of the sampled image;

an image compressing portion in said image source system comprising a skeleton generating mechanism, an image data compressing mechanism, and a skeleton compressing mechanism;

said skeleton generating mechanism comprising means for generating, from image data corresponding to an entire non-blank area of said image of said object, a skeleton pattern as data indicative of characteristics of said image;

said image data compressing mechanism being input with said image data and comprising means for compressing said image data utilizing a first data compression method which achieves a high data compression rate while sacrificing exactness of a restored image data upon decompression;

said skeleton compressing mechanism being input with said skeleton pattern from said skeleton generating mechanism and comprising means for compressing said skeleton pattern utilizing a data compression method which permits complete restoration of an original skeleton pattern, for generating a compressed skeleton pattern;

a data communication path comprising means for connecting, through a communication channel, said image source system and said image data processing system for transmitting said compressed image data together with said compressed skeleton pattern from said image source system to said image data processing system;

an image decompressing portion in said image data processing system comprising an image decompression mechanism and a skeleton decompression mechanism;

said image decompression mechanism being input with said compressed image data received from said data communication path, and comprising means for decompressing said compressed image data;

said skeleton decompression mechanism being input with said compressed skeleton pattern received from said data communication path, and comprising means for decompressing said compressed skeleton pattern for restoring said original skeleton pattern;

a skeleton editing portion being input with said restored original skeleton pattern and said decompressed image data, and comprising means for providing an editing screen image for a user for correction of said original skeleton pattern with reference to said decompressed image data for enabling correction, and means for extracting feature points from the corrected skeleton pattern; and a database recording portion in said image data processing system comprising means for recording the feature points of said skeleton pattern extracted by said skeleton editing portion and said image data in a database.

* * * * *